United States Patent [19]

Jones

[11] 4,045,813
[45] Aug. 30, 1977

[54] METHOD OF OPERATING VIDEO CAMERAS AND LIGHTS UNDERWATER

[75] Inventor: Richard F. Jones, Santa Barbara, Calif.

[73] Assignee: General Aquadyne, Inc., Santa Barbara, Calif.

[21] Appl. No.: 594,789

[22] Filed: July 10, 1975

[51] Int. Cl.² .............................................. H04N 7/18
[52] U.S. Cl. ....................................................... 358/99
[58] Field of Search ................. 178/DIG. 1, 7.1, 7.87, 178/DIG. 38, 1.91, DIG. 20; 358/99

[56] References Cited

U.S. PATENT DOCUMENTS

| 2,987,645 | 6/1961 | Hudgins | 178/7.2 |
| 3,102,924 | 9/1963 | Legler | 178/7.2 |
| 3,315,034 | 4/1967 | White | 178/7.2 |
| 3,437,749 | 4/1969 | Klem | 178/7.2 |
| 3,495,035 | 2/1970 | Ando | 178/7.2 |
| 3,919,475 | 11/1975 | Dukich et al. | 178/DIG. 1 |

OTHER PUBLICATIONS

Fink, *Television Engineering Handbook*, McGraw-Hill, 1957, pp. 5–67; 5–70; 5–76.
Fink, *Principles of television engineering*, McGraw-Hill, 1940, p. 330.
Allanson, "Underwater Observation by Television," Journal of the SMPTE, vol. 65, pp. 311–319, June 1956.

*Primary Examiner*—John C. Martin
*Attorney, Agent, or Firm*—Harry W. Brelsford

[57] ABSTRACT

Video cameras and illuminating lights on the helmets of commercial divers are caused to give satisfactory images in turbid water by a combination of camera adjustment and very low light levels. Lights of five to twenty-five watts total are employed with video cameras that have the sensitivity increased five to ten times normal and wherein the useful light range of the camera is adjusted to be three to five times the illumination from the lamps. It is desirable also to render the automatic gain control of the camera inoperative, at least over the lower part of that light range of the camera.

7 Claims, 3 Drawing Figures

METHOD OF OPERATING VIDEO CAMERAS AND LIGHTS UNDERWATER

My invention relates to underwater video picture taking and has special reference to commercial diving wherein the water is usually dirty and turbid and artificial illumination is used to light the object being imaged.

A standard video camera does not produce good pictures during commercial diving wherein the diver has to operate upon underwater objects such as oil well valves, oil well platform legs and casings, sunken ships, etc. The objects are usually coated with marine growth and dirt particles that are knocked loose during manipulation, and these float in the water. These particles are illuminated by the artificial light and "blind" the camera to obscure the object. Additionally, standard cameras have an automatic gain control that responds to bright objects in the foreground to reduce the signal from the object being imaged to the point where it is no longer visible in a video monitor. Video cameras do not usually have an iris and the lens is wide open at all times. The control for overexposure is done electronically.

Various attempts have been made to eliminate this problem of bright foreground dirt or particles in the water that obscure the image. Some have sought to use brighter lights to brighten the object being imaged. This has only resulted in more intense illumination of foreground dirt, thereby aggravating the problem. Others have sought to place the lights at the object being imaged, but this arrangement is awkward for the diver to manipulate. Others have used a more expensive camera with a light-sensitive screen of low electronic noise level, allowing a lower threshold for the automatic gain control setting. Currently, such cameras are known as silicon screen cameras.

I have discovered a combination of camera adjustments and low light illumination that solves the problem of foreground dirt degrading the video image. In summary, I am able to use a standard video camera in combination with a low intensity light that may be on the order of five to ten watts. This discovery makes possible the use of standard inexpensive video cameras and results in low power transmission to the diver for illumination.

I adjust the automatic gain control of the video camera to a threshold, so that it is inoperative over the lower part of the light response of the camera. I next adjust the sensitivity of the camera so that the camera responds to any illumination just above the internal electronic noise level of the camera circuit. Additionally, I adjust the illumination range of the camera only to those light levels encountered underwater. In effect, therefore, the camera is wide open during the lower part of the illumination gradation from total darkness to normal underwater natural light intensity likely to be encountered. I combine this with a low level of artificial illumination, such as that obtainable with a five- or ten-watt electric incandescent light bulb. In this fashion, the foreground dirt particles do not show brightly on the video image and the object being imaged is always in good contrast and definition. This procedure is generally just the opposite to that recommended for video cameras.

Various objects, advantages, and features of the invention will be apparent in the following description and claims considered together with the drawings forming an integral part of this specification in which:

I have determined that in commercial diving there is no practical need to illuminate the underwater environment more than a distance of two feet. For the sake of convenience, both the camera and the light are mounted on the diver's body, preferably on the diver's helmet. The greatest reach of the diver's arms is about two feet in front of him, and, therefore, objects being worked upon in commercial diving will be no greater than two feet away. Since the camera will image objects within two inches of the camera, the working range is two inches to two feet. This, therefore, is the illumination range, and artificial lights that penetrate beyond this distance merely give rise to foreground dirt and particle illumination that degrade the picture without assisting the diver. Useful illumination ends at about three feet.

I have observed that the greater the light intensity the greater the refraction and reflection, much like the effect of bright lights in fog. I have further discovered that if the sensitivity of a video camera is increased many times over normal it will create useful images in very low light. For the particular type of video camera which I use, which operates in a standard fashion, useful images may be produced from low level light from incandescent bulbs of the five- to ten-watt range, and this low level eliminate reflection and refraction from foreground dirt and particles.

The lights have reflectors of the type commonly used in flashlights, and this factor is to be considered in equating the light performance to a bare bulb. A bare bulb burning underwater illuminates not only a 360° area, but also a spherical pattern. The wattage or other measure of light intensity as used in this specification refers to a generally reflected bundle of rays such as those made by a flashlight with dispersal to illuminate an object about two feet in diameter at a distance of about two feet. Light sources such as gas tubes are more efficient than incandescent bulbs and will deliver more light per watt.

Figure 1:
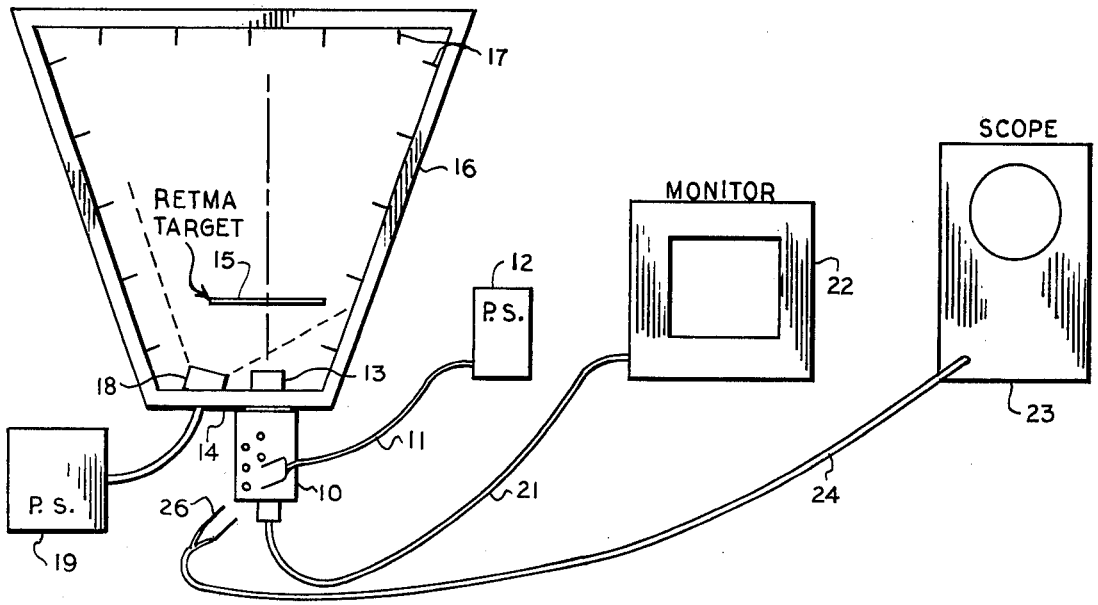
FIG. 1 is a plane view of a calibration tank, camera, and associated apparatus for adjusting the camera to an upper limit of light that will produce good images.

Referring now to FIG. 1, there is illustrated the upper limit calibration apparatus for a standard black and white video camera 10 which is connected by cable 11 to a power supply 12. The camera has a lens 13 that projects through a wall 14 of a water tank 16 that has a black interior having blackened baffles 17. A light 18 also projects through the wall 14 and illuminates a standard television target 15 known as a retma target, which has scales of black at one end, white on the other, and gradations in-between of the entire grey scale from black to white plus resolution lines. This target 15 is placed at any desired distance so that the target fills the screen of the camera 10. A larger target can be placed farther away. It is desirable that the light be directed at the center of the target. The water is preferably clean water. A black lid (not shown) is placed over the box 16 for the calibration. A power supply 19 energizes the light 18.

The output of the camera 10 passes through a cable 21 to a video monitor 22 that displays the image being observed by the camera 10 in much the same fashion as a home television-viewing screen. The output of the camera 10 may also be displayed on an oscilloscope 23 by means of leads 24 and probes 26, which are manually operated to touch output terminals in the camera 10.

The intensity or illumination of light 18 is carefully regulated to give three to five times the amount of light that the light on the diver's helmet delivers. For example, if a nine-watt reflectorized lamp is used by the diver, the light 18 may be adjusted to give an illumination of four times that of the diver's lamp. The video camera is then adjusted so that its clear image response is obtained at this level of illumination.

This adjustment for maximum clear image response at the maximum light of a video camera is referred to as beam voltage adjustment at just below the clipping level of the video signal. If more light is imaged on the camera than it is adjusted for, the electronic signal is clipped because the electronic components cannot transmit a signal of such a strength. This results in a blurred and indistinct image on the video monitor. For example, if one of my cameras is adjusted for the level of light described in tank 16 and this camera is used above water in bright sunlight, the signal will be clipped and the image indistinct, and if the camera images a bright object there will be no image at all on the monitor — only a blur. The phenomenon of electronic flare will obliterate even black lines on such a white illuminated object.

This beam voltage adjustment is performed while watching the oscilloscope response so that a clear indication of response from black to white of the retma target is made.

Figure 2:
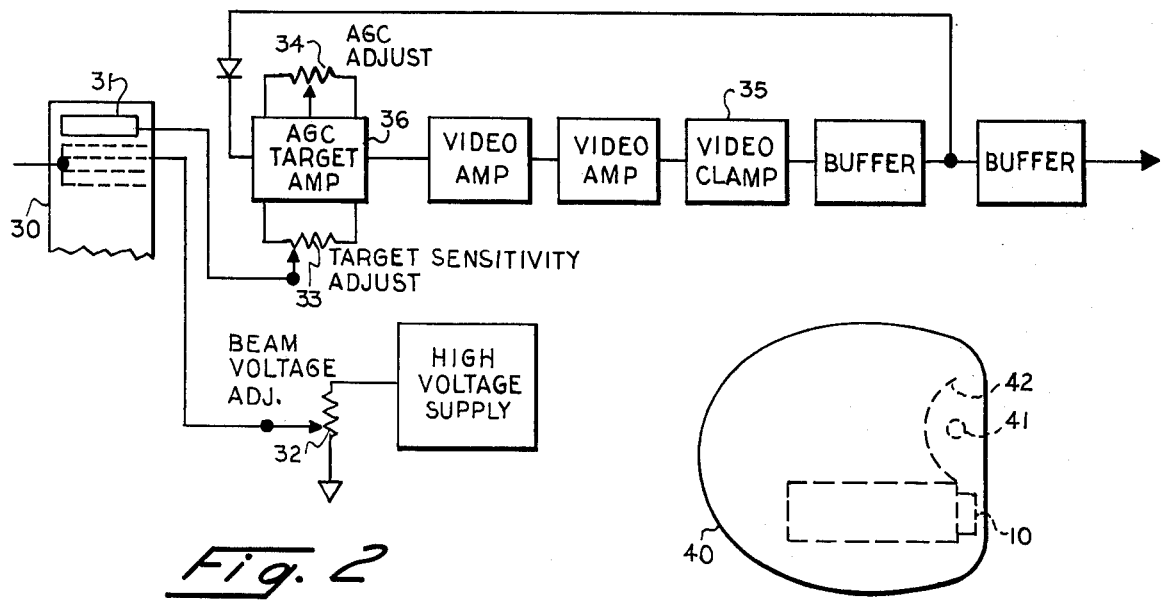
FIG. 2 is a schematic diagram of portions of the electronic components of a presently preferred type of video camera.

The beam voltage adjustment just described is shown on FIG. 2, which is a block schematic of some of the internal electronic components of the video camera 10. Shown at the left is the camera target or screen 31 upon which the optical image impinges. The target 31 is in a video tube 30, and this target or screen is swept by an electronic beam, the intensity of which is regulated by adjustable resistor 32. It is the adjustment of this resistor 32 that achieves this beam voltage adjustment just described.

Having now described the procedure for adjusting the camera 10 for performance at the maximum desired light level, I will now describe the adjustment for the minimum desired light level. I desire this level to be as close to total darkness as possible. Accordingly, the camera is exposed to total darkness, which is conveniently done by placing a cap on the lens 13. The output signal is then monitored by an oscilloscope, and the signal will consist entirely of the internal electronic noise from the various electronic components upon which will be imposed the sync pulse. The bias voltage on the target or screen of the camera is then drastically increased from five to ten times normal. Normal as used by the applicant refers to the off-the-shelf camera designed and adjusted for daylight use. This increases the sensitivity and will, of course, amplify the noise also. However, when a signal from an optical image at a very low light level is impressed on the camera, it will be visible in a monitor.

Referring now to FIG. 2, this target bias adjustment is illustrated diagrammatically as variable resistor 33 forming part of an automatic gain and target amplifier indicated by the box 36. I presently prefer to make this bias about seven times the normal bias for normal use of the camera 10. This adjustment is normally made by measuring the voltage output of the video clamp circuit 35.

I adjust the automatic gain control (AGC) threshold so that it is inoperative over the normal range of light encountered underwater. This adjustment is illustrated in FIG. 2 at a resistor 34 also associated with the target amplifier 36. In practice I prefer an AGC adjustment that operates only when the normal underwater light is exceeded by at least one or two magnitudes. This type of adjustment is possible only because underwater objects are in the grey zone or area, and there is seldom any true whites or blacks encountered, and hence no drastic contrast in the image. Accordingly, the resistor 34 is adjusted so that there is no automatic gain control until the light level of lamp 18 of FIG. 1 is exceeded, and preferably exceeded one or two times. However, some automatic gain control could be utilized in the upper half of the illumination range from darkness to that of light 18, but I prefer at present not to use any AGC in this range.

The net result of the three adjustments (gain, sensitivity, and AGC) is that the sensitivity of the camera under no-light conditions is increased until the noise generated by the camera tube just exceeds the noise level due to the other electrical components. In this way, any light at all, no matter how little, will cause an increase in the amplitude of the output signal produced by the camera.

Figure 3:
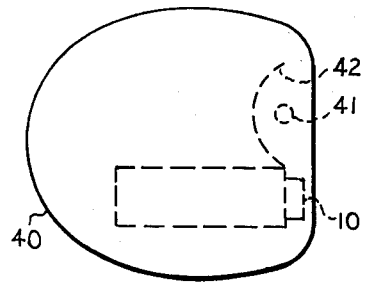
FIG. 3 is a schematic elevation view of a diver's helmet in which is disposed a light and a video camera incorporating the invention.

While I have not scientifically plotted the various lux and lumen values for various conditions, the following is given as an example only and not in limitation of my invention. Referring to FIG. 3, a commonly available black and white video camera 10 of conventional design may be disposed in a waterproof and windowed compartment in a diver's helmet 40 in which is also disposed an incandescent light bulb 41 and a reflector 42. The camera 10 and light may be parallel in orientation and two or three inches apart. The bulb 41 is operated at three hundred milliamperes at approximately thirty volts to give a power consumption of about nine watts. The light emitted underwater is about 180 lux. The nine-watt point source is believed to yield eight candelas with the reflector 42. The light 18 of FIG. 1 emits about 7500 lux underwater. The sensitivity adjustment was made to deliver a peak-to-peak indication of 0.14 volts peak-to-peak at the collector of the video clamp amplifier while the camera is in total darkness. This compares with a peak-to-peak of 0.02 volts peak-to-peak in total darkness for the same camera adjusted normally in accordance with the manufacturer's instructions. Setting clear image response by light 18 in effect compresses the performance range of the camera to give good performance over this range.

Having described my invention with respect to a presently preferred embodiment thereof, as required by the Rules, I do not limit myself to this illustration as various modifications will occur to those skilled in the art. Accordingly, the appended claims include all variations and modifications that fall within the true spirit and scope of the invention.

I claim:
1. The method of operating a television camera and a light underwater wherein the light is adjacent to the camera and illuminates objects being imaged by the camera for the purpose of reducing reflections from foreground particles and dirt comprising:
   a. adjusting the camera for clear image performance up to the point of signal clipping by exposure of the camera to a selected intensity of light of approxi- mately the maximum expected to be encountered underwater;

b. adjusting the sensitivity of the camera within a range of five to ten times normal;

c. and utilizing a light source in the range of light equivalent to that delivered by reflectorized incandescent bulbs in the range of five to twenty-five watts.

2. The method of claim 1 wherein step *a* is performed with light in the range from three to five times the light of step *c*.

3. The method of claim 1 wherein step *c* is in the range of five to fifteen watts.

4. The method of operating a camera of claim 1 wherein the camera has an automatic gain control and in which there is an additional step:

d. rendering the automatic gain control of the camera substantially inoperative over the light range from total darkness to the maximum light of step *a*.

5. The method for operating a diver's video camera underwater with light sources that deliver light in the range of five to twenty-five watts from incandescent reflectorized lamps comprising:

a. setting the clear image response of the camera up to the point of signal clipping with a maximum light in the range of three to five times said light available at the object being imaged by the camera;

b. and adjusting the sensitivity of the camera in the range of five to ten times normal.

6. The method of operating a television camera underwater under turbid conditions for imaging objects up to three feet from the camera comprising:

a. adjusting the sensitivity of the camera within the range of five to ten times normal; and b. illuminating the optical path of the camera view with a light source in the range of light equivalent to reflectorized incandescent bulbs in the range from five to twenty-five watts.

7. Apparatus for underwater video pictures comprising:

a. a light source equivalent to reflectorized incandescent lights in the range of five to twenty-five watts;

b. and a video camera with the threshold sensitivity at five to ten times normal;

chracterized by both the camera and the light source being mounted on the body of the diver, said light being of low enough intensity so that foreground turbidity does not substantially impair imaging by the camera.

* * * * *